Patented May 24, 1932

1,859,997

UNITED STATES PATENT OFFICE

JACOB STEIN, OF PHILADELPHIA, PENNSYLVANIA, ASSIGNOR TO PUBLICKER, INC., OF PHILADELPHIA, PENNSYLVANIA, A CORPORATION OF DELAWARE

METHOD OF DISTILLING ALIPHATIC ESTERS

No Drawing.   Application filed August 15, 1931.   Serial No. 557,424.

My invention relates to a novel method of purifying crude aliphatic esters by distillation, and more particularly it relates to a method of distilling aliphatic esters in which the distillation is unaccompanied by hydrolysis and the resulting production of acid products.

One object of my invention is to provide a process of distilling crude aliphatic esters by which it is possible to maintain neutrality in the crude mixture in the distilling kettle and at the same time to obtain a neutral distillate of the purified ester.

A further object of my invention is to furnish a method of purifying aliphatic esters by distillation which is characterized by the addition of a small amount of a so-called inhibitor to the crude mixture prior to distillation, the inhibitor preventing hydrolysis during the distillation whereby neutralization and redistillation of the distillate become unnecessary.

Other objects will be apparent from a consideration of the specification and claims.

Heretofore, the refining of the aliphatic esters by distillation has always been accompanied by the hydrolysis of a portion of the ester in the distilling kettle. In extreme cases, an acidity of 2.0% has been produced in the distilling kettle, while even under the most favorable conditions the acidity rises to .1% during the distillation of the ester. Since the acid is, for the most part, distilled with the ester, the distillate is contaminated with acid which must be neutralized. This is usually accomplished by the addition of sodium carbonate in amounts greatly in excess of the theoretical amount required for neutralization occasioned by the poor contact existing between the neutralizing agent and the acid. The addition of the sodium carbonate also causes scaling of the heating coils which prevents good heat transfer thereof. If a pure product is desired, as is most often the case, the neutralized ester must be redistilled to remove the salt formed as a result of the neutralization. In this second distillation, difficulty is again encountered due to the tendency of the ester to hydrolyze.

The present invention is characterized by the addition of a so-called inhibitor to the crude mixture of aliphatic ester to be purified by distillation. This inhibitor, which is added in small amounts, prevents the hydrolysis of the aliphatic esters in the presence of heat and water which ordinarily takes place, and thus keeps the crude ester in the distilling kettle in a neutral condition and allows the recovery of a neutral ester distillate. The process is applicable for the distillation of all aliphatic esters such, for example, as ethyl acetate, butyl acetate, iso-butyl acetate, ethyl propionate, amyl acetae, and iso-amyl aceate. The distillation and condensation of the distillate are carried on in the usual manner. One class of inhibitors which is particularly applicable are the alkali metal salts of the aromatic acids, for example, the potassium or sodium salts of benzoic, toluic (methylbenzoic), cumic (p-isopropylbenzoic), phenyl acetic acid, and the like.

Due to the availability and cheapness, I prefer to employ sodium benzoate as the inhibitor. The amount of inhibitor added may be varied, but in general the amount employed will be between .01 grams per liter and 1.5 grams per liter of crude aliphatic ester. If desired, the amount used may exceed the upper limit given without deleteriously affecting the process but, in most cases, the addition of more than 1.5 grams per liter will not increase the effectiveness of the process.

The process of manufacturing and distilling butyl acetate will be given as an example. Glacial acetic acid or any commercial acetic acid of not less than 70% concentration, and butyl alcohol are mixed in a distilling kettle employing one and one-half mols of butyl alcohol to one mol of the acetic acid. Sulphuric acid is then added to the mixture in such an amount that it will equal 1% by weight of the total liquid in the kettle. Heat is applied to the kettle and a constant boiling mixture of butyl acetate and water is removed as the distillate. This separates on standing into two layers, and the top or oily layer is returned to the kettle. In this way the bulk of the water is removed from the reaction kettle. The butyl acetate remaining in the kettle containing a small amount of acetic acid and sulphuric acid is cooled, neutralized and washed with water. The inhibitor in this particular case, sodium benzoate, is then added to the combined neutralized and washed butyl acetate mixture in an amount sufficient to prevent hydrolysis during the refining of the wet ester, the exact amount added not being critical but in general being between .01 grams per liter and 1.5 grams per liter of crude ester. The mixture is then distilled by the addition of heat to the kettle and the ester vapors are removed from the kettle and condensed in the usual manner. In this process the condensed ester distillate will be found to be neutral.

Considerable modification is possible in the process of preparing and purifying the aliphatic ester and in the nature and amount of inhibitor added without departing from the essential features of my invention.

I claim:

1. The process of distilling an aliphatic ester which comprises adding a small amount of an alkali metal salt of an aromatic acid to the crude ester to prevent hydrolysis thereof, subjecting the crude ester to heat to distill the ester, and thereafter condensing the distilled ester.

2. The process of distilling an aliphatic ester which comprises adding a small amount of an alkali metal benzoate to the crude ester to prevent hyrolysis thereof, subjecting the crude ester to heat to distill the ester, and thereafter condensing the distilled ester.

3. The process of distilling an aliphatic ester which comprises adding a small amount of sodium benzoate to the crude ester to prevent hydrolysis thereof, subjecting the crude ester to heat to distill the ester, and thereafter condensing the distilled ester.

4. The process of distilling butyl acetate which comprises adding a small amount of an alkali metal salt of an aromatic acid to the crude butyl acetate to prevent hydrolysis thereof, subjecting the crude butyl acetate to heat to distill the butyl acetate, and thereafter condensing the distilled butyl acetate.

5. The process of distilling butyl acetate which comprises adding a small amount of an alkali metal benzoate to the crude butyl acetate to prevent hydrolysis thereof, subjecting the crude butyl acetate to heat to distill the butyl acetate, and thereafter condensing the distilled butyl acetate.

6. The process of distilling butyl acetate which comprises adding a small amount of sodium benzoate to the crude butyl acetate to prevent hydrolysis thereof, subjecting the crude butyl acetate to heat to distill the butyl acetate, and thereafter condensing the distilled butyl acetate.

7. The process of distilling an aliphatic ester which comprises adding an alkali metal benzoate to the crude ester to prevent hydrolysis thereof, said alkali metal benzoate being added in amounts from .01 grams to 1.5 grams per liter of crude ester, subjecting the crude ester to heat to distill the ester, and thereafter condensing the distilled ester.

8. The process of distilling an aliphatic ester which comprises adding sodium benzoate to the crude ester to prevent hydrolysis thereof, said sodium benzoate being added in amounts from .01 grams to 1.5 grams per liter of crude ester, subjecting the crude ester to heat to distill the ester, and thereafter condensing the distilled ester.

9. The process of distilling butyl acetate which comprises adding an alkali metal benzoate to the crude butyl acetate to prevent hydrolysis thereof, said alkali metal benzoate being added in amounts from .01 grams to 1.5 grams per liter of crude butyl acetate, subjecting the crude butyl acetate to heat to distill the butyl acetate, and thereafter condensing the distilled butyl acetate.

10. The process of distilling butyl acetate which comprises adding sodium benzoate to the crude butyl acetate to prevent hydrolysis thereof, said sodium benzoate being added in amounts from .01 grams to 1.5 grams per liter of crude butyl acetate, subjecting the crude butyl acetate to heat to distill the butyl acetate, and thereafter condensing the distilled butyl acetate.

JACOB STEIN.